US012741584B2

(12) United States Patent
Totsuka et al.

(10) Patent No.: US 12,741,584 B2
(45) Date of Patent: Sep. 22, 2026

(54) ACTUATOR AND ON-VEHICLE DEVICE USING SAME

(71) Applicant: KOITO MANUFACTURING CO., LTD., Tokyo (JP)

(72) Inventors: Takahiro Totsuka, Shizuoka (JP); Yuichi Watano, Shizuoka (JP); Takashi Terayama, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 19/124,008

(22) PCT Filed: Oct. 17, 2023

(86) PCT No.: PCT/JP2023/037567
§ 371 (c)(1),
(2) Date: Apr. 24, 2025

(87) PCT Pub. No.: WO2024/095764
PCT Pub. Date: May 10, 2024

(65) Prior Publication Data
US 2026/0192738 A1 Jul. 9, 2026

(30) Foreign Application Priority Data
Nov. 1, 2022 (JP) ................................ 2022-175667

(51) Int. Cl.
*B60Q 1/068* (2006.01)
*B60Q 1/076* (2006.01)
*F21S 41/657* (2018.01)

(52) U.S. Cl.
CPC ............ *B60Q 1/068* (2013.01); *B60Q 1/076* (2013.01); *F21S 41/657* (2018.01); *B60Q 2200/30* (2013.01)

(58) Field of Classification Search
CPC .... B60Q 1/068; B60Q 1/076; B60Q 2200/30; F21S 41/657
See application file for complete search history.

(56) References Cited

U.S. PATENT DOCUMENTS

2008/0112179 A1* 5/2008 Tatara .................... B60Q 1/076 362/515
2009/0086500 A1* 4/2009 Tatara ...................... B60Q 1/12 362/512
(Continued)

FOREIGN PATENT DOCUMENTS

JP 07-119339 A 5/1995
JP 2005-351154 A 12/2005
(Continued)

OTHER PUBLICATIONS

International Search Report for PCT/JP2023/037567 dated Dec. 5, 2023.

*Primary Examiner* — Evan P Dzierzynski
(74) *Attorney, Agent, or Firm* — Sughrue Mion, PLLC

(57) ABSTRACT

An actuator includes an input member, a first output member, a second output member, and a power transmission switching unit. The power transmission switching unit establishes a first connection state in which the first output member rotates forward/backward in line with forward/backward rotation of the input member in a first state, establishes a second connection state in which the second output member rotates forward in a second state, establishes a third connection state in which the second output member rotates backward in a third state, establishes the first connection state in which a predetermined range is shifted to the forward rotation side when the input member rotates backward in the second connection state, and establishes the first connection state in which the predetermined range is shifted (Continued)

to the backward rotation side when the input member rotates forward in the third connection state.

8 Claims, 13 Drawing Sheets

(56) References Cited

U.S. PATENT DOCUMENTS

| | | | | |
|---|---|---|---|---|
| 2013/0204498 | A1* | 8/2013 | Suzuki | B60Q 1/24<br>362/516 |
| 2015/0036365 | A1* | 2/2015 | Schoen | B64D 47/04<br>362/470 |

FOREIGN PATENT DOCUMENTS

| | | | |
|---|---|---|---|
| JP | 2005331148 | A * | 12/2005 |
| JP | 4761562 | B2 | 8/2011 |
| JP | 2018-031456 | A | 3/2018 |

* cited by examiner 22
23
24
24h
25
26
26h
27
45
46
46h
70
70h1
70h2
60
60h
61
62
65
66
80
81
82
83
84
85
86
87
88
89
50
51
52
53
54
55
57
110
111
111a
112
112a
113
113
114
114
114a
114b
115
115a
115b
115c
90
91
92
93
42
42a
32
33
34
34h
35
36
36h
37
41
41a
41b
41c
41d
41e
41f
120
121
121a
121h
122
122
122

41f
88
61
52
86
85
41ds1
87
41d
84
41ds2
62
41c
22
65
82
42a
42

ACTUATOR AND ON-VEHICLE DEVICE USING SAME

CROSS REFERENCE TO RELATED APPLICATIONS

This application is a National Stage of International Application No. PCT/JP2023/037567 filed Oct. 17, 2023, claiming priority based on Japanese Patent Application No. 2022-175667 filed Nov. 1, 2022.

TECHNICAL FIELD

The present invention relates to an actuator and an on-vehicle device using the same.

BACKGROUND ART

An actuator that changes the orientation of an electronic device is known, and Patent Literature 1 described below discloses a lighting device for a vehicle, including an actuator that changes the orientation of a lamp unit as an electronic device.

An actuator of Patent Literature 1 described below includes an output shaft extending in an up-down direction, two motors, and a power transmission unit including a plurality of gears. The power transmission unit is configured to rotate the output shaft about an axis of the output shaft by the torque of one motor and move the output shaft in the longitudinal direction by the torque of the other motor. The output shaft of the actuator is connected to a lower portion of the lamp unit supported so as to be swingable in the up-down direction and the left-right direction. Therefore, when the output shaft of the actuator rotates about the axis of the output shaft, the orientation of the lamp unit in the left-right direction is changed, and when the output shaft of the actuator moves in the longitudinal direction, the orientation of the lamp unit in the up-down direction is changed.

[Patent Literature 1] JP 4761562 B2

SUMMARY OF INVENTION

The actuator of Patent Literature 1 described above changes the orientation of the lamp unit in two directions non-parallel to each other using two motors, and thus the cost tends to increase.

In view of the above, an object of the present invention is to provide an actuator that can change the orientation of an electronic device in two directions non-parallel to each other by one motor, and an on-vehicle device using the actuator.

In order to achieve the above object, an actuator according to the present invention includes an input member configured to rotate about a rotation axis by torque of a motor, a first output member configured to rotate about a first rotation axis, a second output member configured to rotate about a second rotation axis non-parallel to the first rotation axis, and a power transmission switching unit configured to switch between a state in which the first output member rotates and a state in which the second output member rotates by torque of the input member. The power transmission switching unit is configured to connect the input member and the first output member to establish a first connection state in a first rotation state in which a rotation angle of the input member is within a predetermined range, and ensure that the first output member rotates forward in line with forward rotation of the input member and the first output member rotates backward in line with backward rotation of the input member, connect the input member and the second output member to establish a second connection state in a second rotation state in which the input member rotates forward by an angle exceeding an upper limit of the predetermined range, and ensure that the second output member rotates forward in line with forward rotation of the input member, connect the input member and the second output member to establish a third connection state in a third rotation state in which the input member rotates backward by an angle falling below a lower limit of the predetermined range, and ensure that the second output member rotates backward in line with backward rotation of the input member, establish the first connection state in which the predetermined range is shifted to a forward rotation side of the input member by an angle from the upper limit of the predetermined range to a rotation angle of the input member in backward rotation when the input member rotates backward in the second connection state, and establish the first connection state in which the predetermined range is shifted to a backward rotation side of the input member by an angle from the lower limit of the predetermined range to a rotation angle of the input member in forward rotation when the input member rotates forward in the third connection state.

In this actuator, the first output member can be set to the desired rotation angle while setting the second output member to the desired rotation angle by setting the rotation angle of the second output member to the desired rotation angle in the second connection state and then rotating the input member backward to establish the first connection state, or by setting the rotation angle of the second output member to the desired rotation angle in the third connection state and then rotating the input member forward to establish the first connection state. The first rotation axis as a rotation axis of the first output member and a second rotation axis as a rotation axis of the second output member are non-parallel to each other. With this configuration, this actuator can change the orientation of an electronic device with respect to the support member in each of the direction perpendicular to the first rotation axis and the direction perpendicular to the second rotation axis by attaching the electronic device to one of the first output member or the second output member and causing the support member to support the other thereof. Therefore, this actuator can change the orientation of an electronic device in two directions non-parallel to each other by one motor.

The actuator described above may further includes a substrate on which a sensor configured to detect inclination is mounted, the substrate being configured to rotate together with the first output member.

With such a configuration, the rotation angle of the first output member can be detected.

In this case, the substrate may extend in a direction perpendicular to the first rotation axis.

With such a configuration, the rotation angle of the first output member can be detected more accurately.

The rotation axis of the input member may coincide with the first rotation axis.

With such a configuration, the power transmission switching unit can avoid having a complicated configuration as compared with the case in which the rotation axis of the input member does not coincide with the first rotation axis.

The first rotation axis and the second rotation axis may perpendicularly intersect each other.

The actuator described above may further include a shaft extending along the first rotation axis, the shaft being configured to rotate together with the first output member. The first output member may include a shaft portion extending along the first rotation axis on an opposite side of the shaft in a direction along the first rotation axis.

With such a configuration, an electronic device can be attached to the shaft and the shaft portion of the first output member, and this can reduce a load applied to the first output member and improve durability.

An on-vehicle device according to the present invention includes the actuator described above, an electronic device attached to one of the first output member or the second output member of the actuator, and a support member that supports the other of the first output member or the second output member.

This on-vehicle device can change the orientation of the electronic device in two directions non-parallel to each other by one motor.

The electronic device described above may be a lamp unit configured to emit light toward a front of a vehicle. An emission direction of light emitted from the lamp unit may be changed in an up-down direction by rotation of the first output member, and an emission direction of light emitted from the lamp unit may be changed in a left-right direction by rotation of the second output member.

As described above, the present invention can provide an actuator that can change the orientation of an electronic device in two directions non-parallel to each other by one motor, and an on-vehicle device using the actuator.

DESCRIPTION OF EMBODIMENTS

Figure 1:
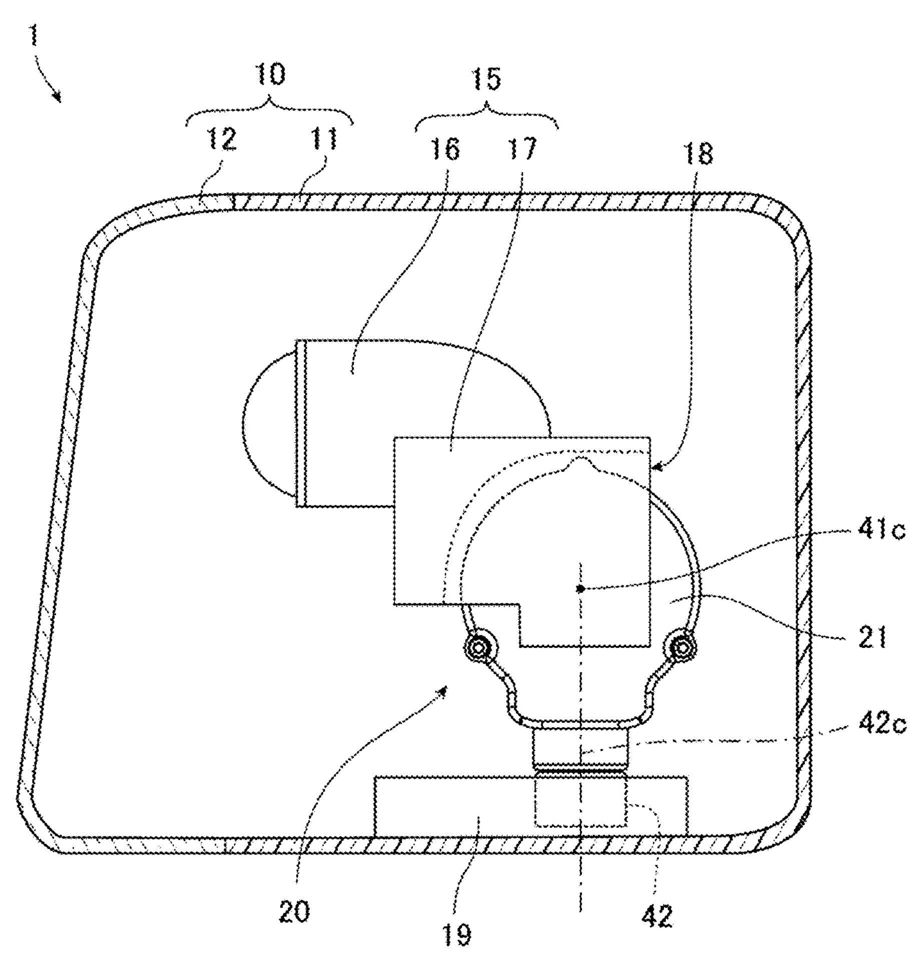
FIG. 1 is a side view illustrating an on-vehicle device in an embodiment of the present invention.

Hereinafter, preferred embodiments of an actuator and an on-vehicle device according to the present invention will be described in detail with reference to the drawings. The embodiments illustrated below are intended to facilitate understanding of the present invention and are not intended for a limited interpretation of the present invention. The present invention can be modified and improved without departing from the spirit thereof. Moreover, in the present invention, components in the embodiments exemplified below may be appropriately combined. Note that the drawings referred to below may illustrate each member by changing dimensions thereof for facilitating understanding. In the drawings, for the sake of ensuring viewability, only some of similar components are denoted by reference signs, and some reference signs may be omitted.

FIG. 1 is a side view illustrating an on-vehicle device in the present embodiment. The on-vehicle device of the present embodiment is a vehicle headlamp, and is a headlamp for an automobile. The vehicle headlamp is generally provided on the front side of a vehicle in each of left and right directions. In the present specification, "right" means the right side in the forward direction of a vehicle, and "left" means the left side in the forward direction of the vehicle. Each of the left and right vehicle headlamps has the same configuration except that the shapes thereof are substantially symmetrical in the left-right direction. Therefore, a vehicle headlamp on one side will be described below.

As illustrated in FIG. 1, a vehicle headlamp 1 of the present embodiment mainly includes a case 10, a lamp unit 15 as an electronic device, a support member 19, and an actuator 20. Note that FIG. 1 illustrates a vertical cross section of the case 10. The case 10 includes a lamp housing 11 and a light-transmissive front cover 12. The lamp housing 11 has an opening on the front side, and the front cover 12 is fixed to the lamp housing 11 so as to close the opening. The space formed by the lamp housing 11 and the front cover 12 is an accommodation space, which accommodates the lamp unit 15, the support member 19, and the actuator 20.

The lamp unit 15 emits light toward the front of the vehicle. In the present embodiment, the lamp unit 15 includes a body portion 16 and a support portion 17. The body portion 16 includes a light source (not illustrated) and is configured to emit light of a predetermined light distribution pattern in the forward direction. The light emitted from the body portion 16 is emitted toward the front of the vehicle through the front cover 12. Examples of the predetermined light distribution pattern include a low-beam light distribution pattern and a high-beam light distribution pattern. Note that the configuration of the body portion 16 is not limited, and the body portion 16 may be capable of changing the light distribution pattern of the light to be emitted.

The support portion 17 is a member that supports the body portion 16. The support portion 17 of the present embodiment is a heat sink that cools the light source included in the body portion 16, and the body portion 16 is fixed over the upper surface and the front surface of the support portion 17. Note that the support portion 17 only needs to be able to support the body portion 16, and may not be a heat sink.

Figure 2:
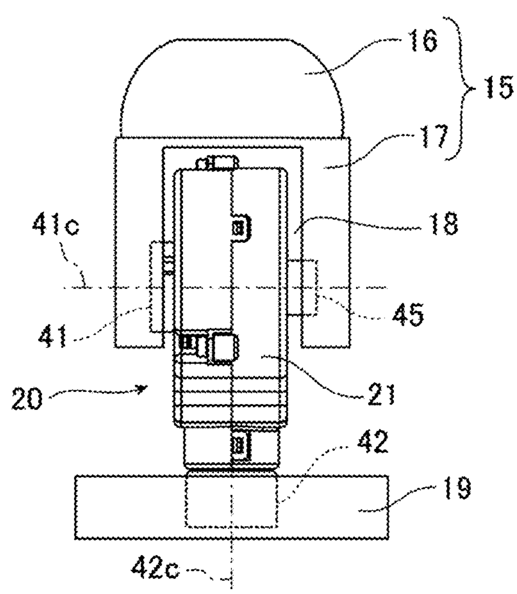
FIG. 2 is a rear view of a lamp unit, a support member, and an actuator.

FIG. 2 is a rear view of the lamp unit 15, the support member 19, and the actuator 20. As illustrated in FIG. 2, an internal space 18 that is open from the rear side to the lower side is formed in the support portion 17.

As illustrated in FIGS. 1 and 2, the actuator 20 of the present embodiment includes a case 21, a first output member 41 that rotates about a first rotation axis 41*c*, a second output member 42 that rotates about a second rotation axis 42*c* non-parallel to the first rotation axis 41*c*, and a shaft 45. In the present embodiment, a part of the first output member 41 protrudes leftward from the case 21, and the first rotation axis 41*c* extends along the left-right direction perpendicular to the vertical direction. The second output member 42 is located below the first output member 41, and a part of the second output member 42 protrudes downward from the case 21. The second rotation axis 42*c* extends along the vertical direction, and the first rotation axis 41*c* and the second rotation axis 42*c* intersect vertically. The shaft 45 is located on the right side with respect to the first output member 41 and extends along the first rotation axis 41*c*, and a part of the shaft 45 protrudes rightward from the case 21. The shaft 45 rotates about the first rotation axis 41*c* together with the first output member 41.

The actuator 20 is disposed so that a part of the actuator 20 is located in the internal space 18 of the support portion 17, and each of the end portion of the first output member 41 and the end portion of the shaft 45 is fixed to the support portion 17. The second output member 42 is fixed to the support member 19. The support member 19 of the present embodiment is a plate-shaped member fixed to the lamp housing 11, but the support member 19 only needs to support the second output member 42, and for example, a part of the lamp housing 11 may be the support member 19.

In the vehicle headlamp 1 described above, the first output member 41 and the shaft 45 rotate about the first rotation axis 41*c*, whereby the orientation of the lamp unit 15 in the up-down direction is changed, and the emission direction of the light emitted from the body portion 16 is changed in the up-down direction. In addition, the second output member 42 rotates about the second rotation axis 42*c*, whereby the orientation of the lamp unit 15 in the left-right direction changes, and the emission direction of the light emitted from the body portion 16 changes in the left-right direction.

Next, a detailed configuration of the actuator 20 will be described.

Figure 3:
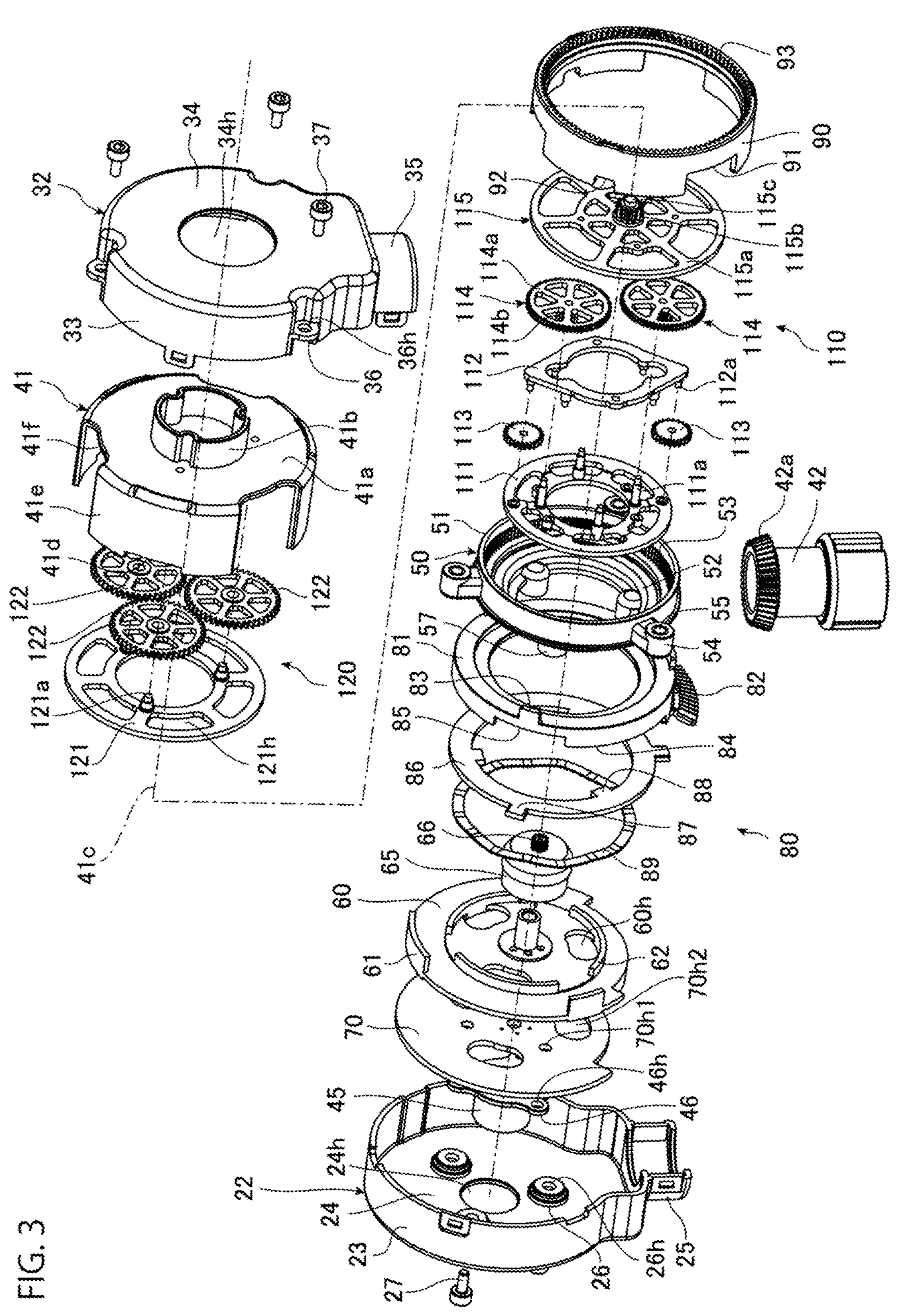
FIG. 3 is an exploded perspective view of the actuator as viewed from an obliquely upper left side.
Figure 4:
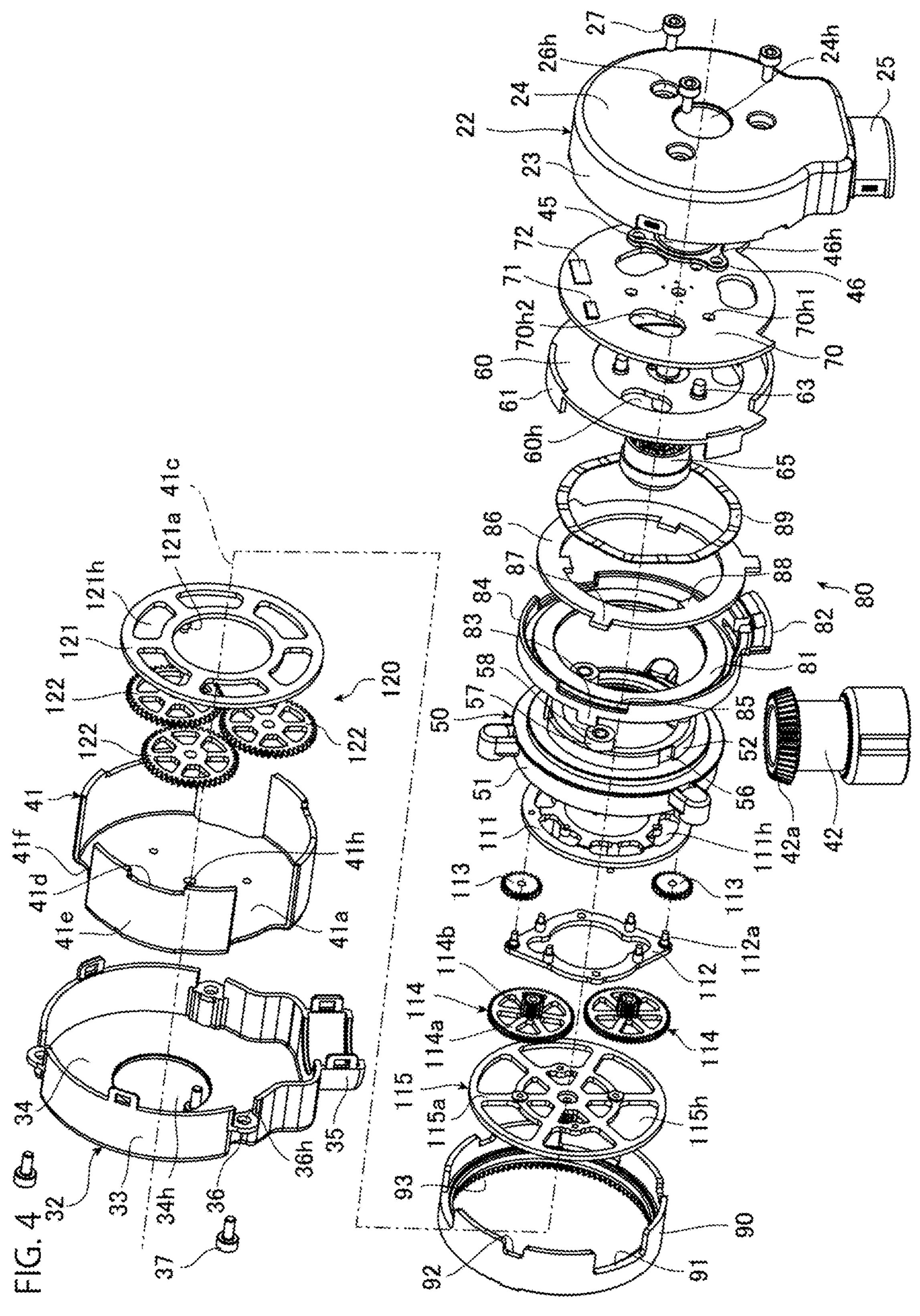
FIG. 4 is an exploded perspective view of the actuator as viewed from an obliquely upper right side.
Figure 5:
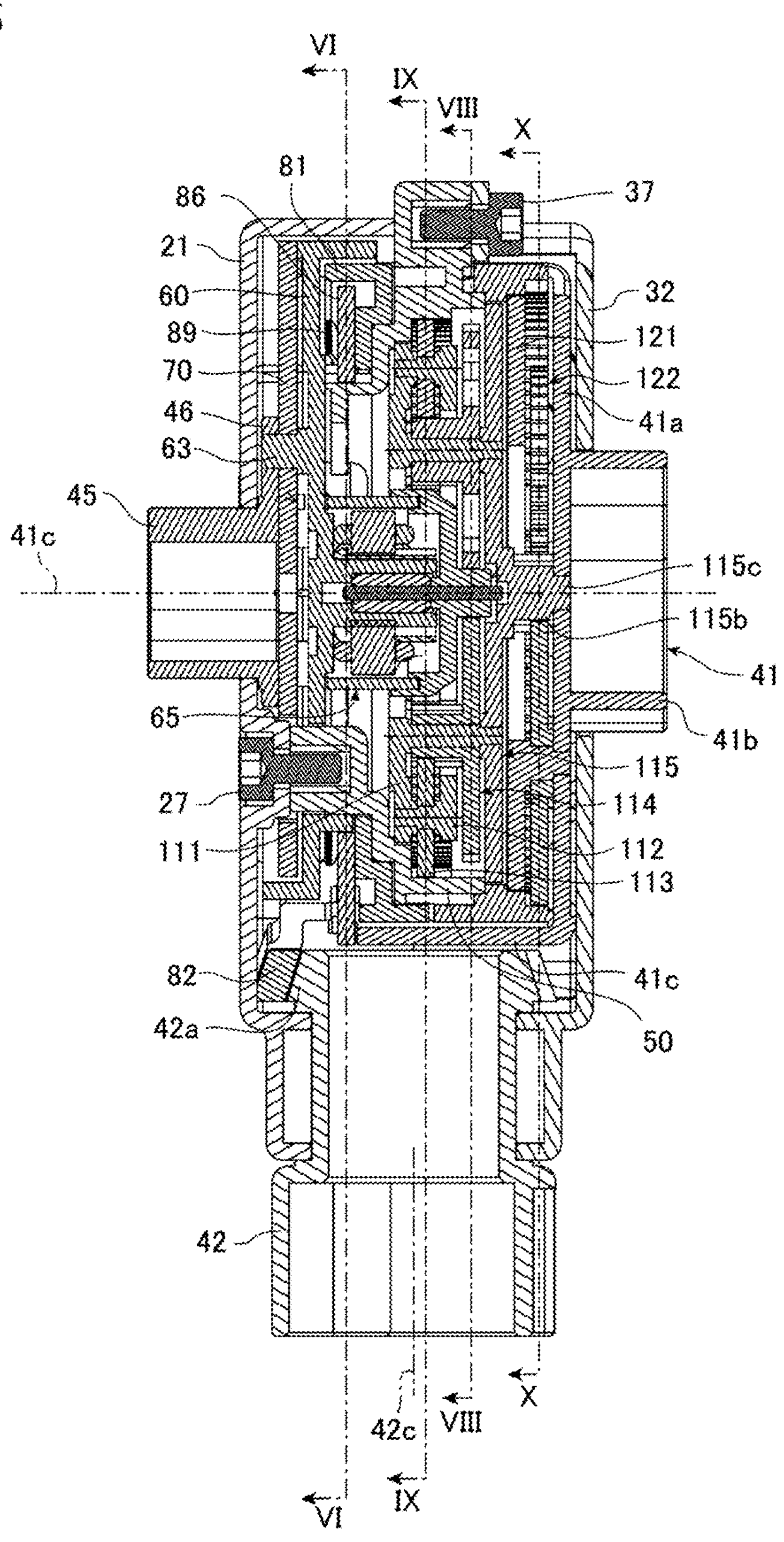
FIG. 5 is a vertical sectional view of the actuator.

FIG. 3 is an exploded perspective view of the actuator 20 as viewed from an obliquely upper left side, and FIG. 4 is an exploded perspective view of the actuator 20 as viewed from an obliquely upper right side. FIG. 5 is a vertical sectional view of the actuator 20, and is a vertical sectional view includes the first rotation axis 41*c*. As illustrated in FIGS. 3, 4, and 5, the actuator 20 mainly includes the case 21, the first output member 41, the second output member 42, the shaft 45, a fixing gear 50, a base plate 60, a motor 65, a substrate 70, a power transmission switching unit 80, a switching gear 90, a first gearbox unit 110, and a second gearbox unit 120.

As illustrated in FIGS. 3 and 4, the fixing gear 50 is a member to which the case 21 is fixed. The fixing gear 50 includes a first cylinder portion 51 having a cylindrical shape and extending along the first rotation axis 41*c*, and a second cylinder portion 52 having a cylindrical shape, located on the right side with respect to the first cylinder portion 51, and extending along the first rotation axis 41*c*. The second cylinder portion 52 is thinner than the first cylinder portion 51 and is connected to a right end portion, which is an end portion on one side of the first cylinder portion 51. The first cylinder portion 51 and the second cylinder portion 52 are integrally formed. An internal gear 53 is provided on an inner peripheral surface of the first cylinder portion 51, and a plurality of protruding portions 54 protruding outward are provided on an outer peripheral surface of the first cylinder portion 51. A screw hole 55 is provided in each of the protruding portions 54. A plurality of grooves 56 are provided at the outer peripheral surface of the second cylinder portion 52. The plurality of grooves 56 each extend along the first rotation axis 41*c* from the end of the second cylinder portion 52 opposite the first cylinder portion 51 side. A plurality of protrusions 57 protruding toward the opposite side of the first cylinder portion 51 side are provided at the end portion of the second cylinder portion 52 opposite the first cylinder portion 51 side. A screw hole 58 is provided in each of the protrusions 57. The case 21 is fixed to the fixing gear 50 described above.

The case 21 includes a right case portion 22 and a left case portion 32. The right case portion 22 includes a cylindrical frame wall 23 extending along the first rotation axis 41*c*, a bottom wall 24 closing an opening on the right side of the frame wall 23, and a semi-cylindrical lower wall 25 extending along the second rotation axis 42*c* and connected to a lower portion of the frame wall 23. A cutout is provided at a lower portion of the frame wall 23, and a space surrounded by the frame wall 23 and the bottom wall 24 communicates with an internal space of the lower wall 25. A through-hole 24*h* for the shaft 45 is provided at the bottom wall 24. The bottom wall 24 includes a plurality of pedestal portions 26 located around the through-hole 24*h* and protruding toward the left case portion 32. Each of the pedestal portions 26 includes a through-hole 26*h* for a screw. The through-hole 26*h* passes through the pedestal portion 26 along the protruding direction of the pedestal portion 26. The through-hole 26*h* corresponds to the screw hole 58 of the fixing gear 50. A screw 27 is inserted into the through-hole 26*h* and fastened to the screw hole 58, whereby the right case portion 22 is fixed to the fixing gear 50.

The left case portion 32 is substantially symmetric with the right case portion 22. The left case portion 32 includes a cylindrical frame wall 33 extending along the first rotation axis 41*c*, a bottom wall 34 closing an opening on the left side of the frame wall 33, and a semi-cylindrical lower wall 35 extending along the second rotation axis 42*c* and connected to a lower portion of the frame wall 33. A cutout is provided at a lower portion of the frame wall 33, and a space surrounded by the frame wall 33 and the bottom wall 34 communicates with an internal space of the lower wall 35. The bottom wall 34 includes a through-hole 34*h* for a shaft portion 41*b* of the first output member 41 to be described later. The frame wall 33 includes a plurality of flange portions 36, and each of the flange portions 36 includes a through-hole 36*h* for a screw. The through-hole 36*h* corresponds to the screw hole 55 of the fixing gear 50. A screw 37 is inserted into the through-hole 36*h* and fastened to the screw hole 55, whereby the left case portion 32 is fixed to the fixing gear 50. The left case portion 32 is fixed to the right case portion 22 by a lock mechanism. As described above, the left case portion 32 and the right case portion 22 is fixed to the fixing gear 50, thereby forming an accommodation space surrounded by the left case portion 32 and the right case portion 22. The accommodation space accommodates a member including the fixing gear 50.

The base plate 60 is a disk-shaped member extending in a direction perpendicular to the first rotation axis 41*c*, and is disposed between the fixing gear 50 and the bottom wall 24 of the right case portion 22. The motor 65 is fixed to the surface of the base plate 60 on the fixing gear 50 side so that the output shaft is along the first rotation axis 41*c*, and a spur gear 66 is fixed to the output shaft of the motor 65. A plurality of outer walls 61 are provided at the outer peripheral edge portion of the base plate 60. Each of the plurality of outer walls 61 extends along the outer peripheral edge portion at predetermined intervals and protrudes toward the fixing gear 50. A plurality of inner walls 62 extending along a circle centered on the first rotation axis 41*c* and protruding toward the fixing gear 50 is provided on the inner side with respect to the outer wall 61. A plurality of through-holes 60*h* corresponding to the protrusions 57 of the fixing gear 50 are provided between the inner walls 62 and the motor 65. A plurality of bosses 63 protruding toward the right case portion 22 are provided on the surface of the base plate 60 on the right case portion 22 side.

The substrate 70 extends in a direction perpendicular to the first rotation axis 41*c*, and is disposed between the base plate 60 and the bottom wall 24 of the right case portion 22. A sensor 71 that detects inclination and a control unit 72 that controls the motor 65 are mounted on the surface of the substrate 70 on the right case portion 22 side. The sensor 71 can detect inclination in the up-down direction and the left-right direction. Examples of the sensor 71 include a three-axis gyro sensor, a three-axis acceleration sensor, a three-axis geomagnetic sensor, and a sensor in which at least two of these sensors are combined. Examples of the control unit 72 include integrated circuits such as a microcontroller, an integrated circuit (IC), a large-scale integrated circuit (LSI), and an application specific integrated circuit (ASIC). A signal from the sensor 71 is input to the control unit 72, and the control unit 72 controls the motor 65 on the basis of the signal. The substrate 70 includes a plurality of first through-holes 70*h*1 corresponding to the bosses 63 of the base plate 60, and a plurality of second through-holes 70*h*2 corresponding to the through-holes 60*h* of the base plate 60.

The shaft 45 is a cylindrical member disposed on the bottom wall 24 side of the right case portion 22 with respect to the substrate 70 and extending along the first rotation axis 41*c*. A flange portion 46 extending in a direction perpendicular to the first rotation axis 41*c* is provided at an end portion of the shaft 45 on the substrate 70 side. A plurality of through-holes 46*h* corresponding to the first through-holes 70*h*1 of the substrate 70 are provided at the flange portion 46. The shaft 45 is inserted into the through-hole 24*h* in the bottom wall 24 of the right case portion 22, and a part of the shaft 45 is exposed to the outside. The boss 63 of the base plate 60 is inserted into the first through-hole 70*h*1 of the substrate 70 and the through-hole 46*h* of the flange portion 46, and the substrate 70 and the flange portion 46 are sandwiched between the base plate 60 and the bottom wall 24 of the right case portion 22. In this way, the substrate 70 and the shaft 45 are attached to the base plate 60. The protrusion 57 of the fixing gear 50 is inserted into the through-hole 60*h* of the base plate 60 and the second through-hole 70*h*2 of the substrate 70, and is brought into contact with the pedestal portion 26 of the right case portion 22. A space is formed between the base plate 60 and the bottom wall 24 of the right case portion 22, and the sensor 71 and the control unit 72 are located in the space. Note that the attachment direction of the substrate 70 and the shaft 45 to the base plate 60 is not limited. The shaft 45 may be a rod-shaped member.

As illustrated in FIGS. 3 and 4, the power transmission switching unit 80 is located between the fixing gear 50 and the base plate 60, and includes a clutch gear 81, a clutch plate 86, and a clutch spring 89. The clutch gear 81 is an annular member centered on the first rotation axis 41*c*, the second cylinder portion 52 of the fixing gear 50 is inserted into the clutch gear 81, and is rotatable in the circumferential direction about the first rotation axis 41*c* with respect to the fixing gear 50. A gear portion 82 protruding downward is provided at the lower portion of the clutch gear 81. The gear portion 82 is a part of a bevel gear about the first rotation axis 41*c*. A plurality of protrusions 83 extending along the outer peripheral edge portion and protruding toward the fixing gear 50 are provided on the surface of the clutch gear 81 on the fixing gear 50 side at predetermined intervals. A peripheral wall 84 extending along the outer peripheral edge portion and protruding toward the base plate 60 is provided on the surface of the clutch gear 81 on the base plate 60 side. The peripheral wall 84 includes a plurality of cutouts 85 extending from the end on the base plate 60 side to the fixing gear 50 side.

The clutch plate 86 is an annular plate member centered on the first rotation axis 41*c*, and is disposed along the surface of the clutch gear 81 on the base plate 60 side. The clutch plate 86 includes a plurality of first protruding portions 87 each protruding outward from the outer peripheral edge. The first protruding portion 87 protrudes outward from the cutout 85 of the peripheral wall 84 in the clutch gear 81. The clutch plate 86 includes a plurality of second protruding portions 88 each protruding inward from the inner peripheral edge. The second protruding portion 88 corresponds to the groove 56 provided at the second cylinder portion 52 of the fixing gear 50, and is inserted into the groove 56. This prevents the clutch plate 86 from rotating in the circumferential direction with respect to the fixing gear 50.

The clutch spring 89 is an elastic member that is disposed between the base plate 60 and the clutch plate 86 and presses the clutch plate 86 against the clutch gear 81. In the present embodiment, the clutch spring 89 is an annular flat spring, but is not limited thereto. The clutch plate 86 is pressed against the clutch gear 81 by the elastic force of the clutch spring 89, whereby the clutch gear 81 is pressed against the fixing gear 50, and the clutch gear 81 is prevented from rotating in the circumferential direction with respect to the fixing gear 50.

Figure 6:
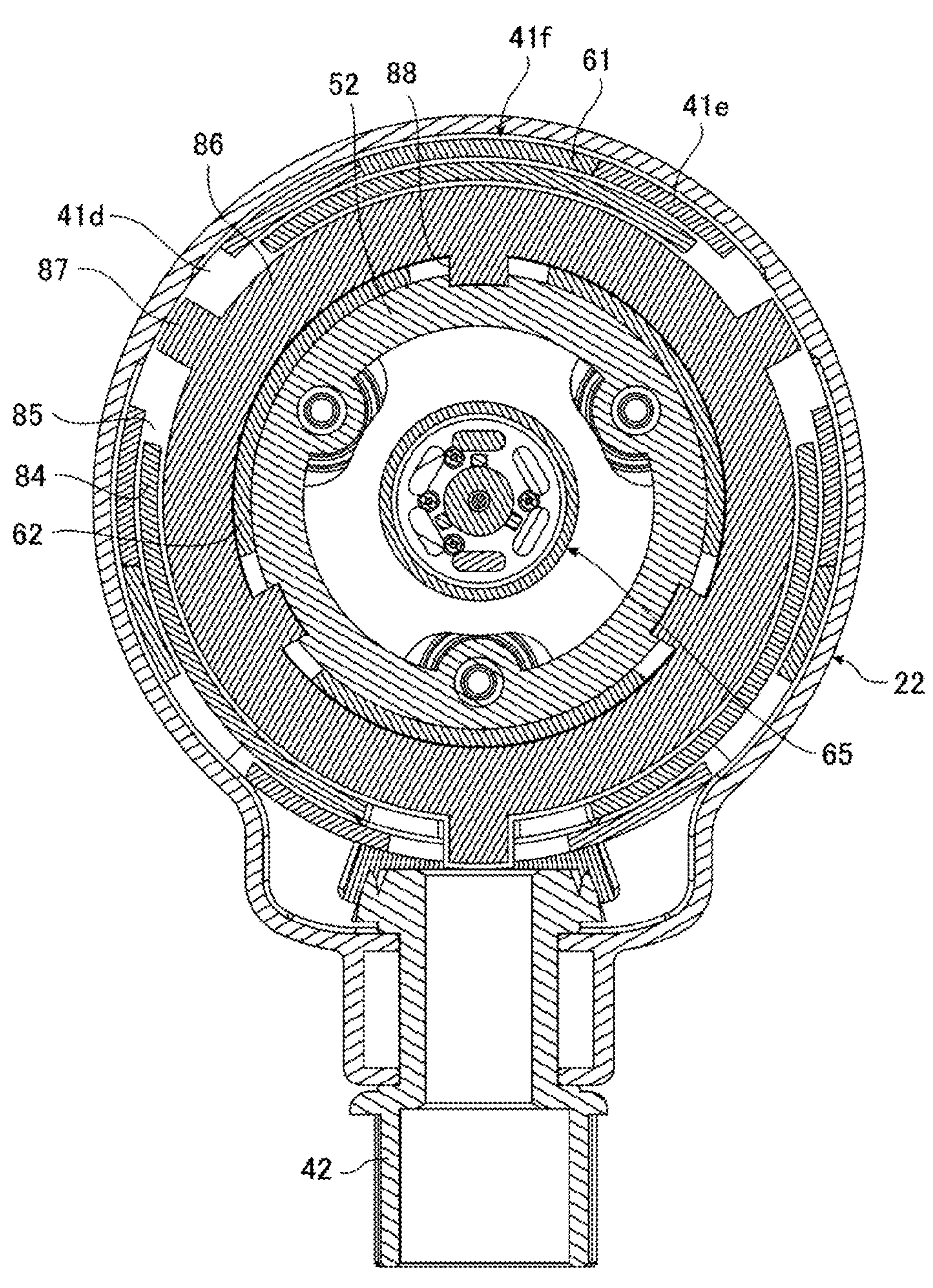
FIG. 6 is a sectional view of the actuator, taken along line VI-VI in FIG. 5.

FIG. 6 is a sectional view of the actuator 20, taken along line VI-VI in FIG. 5, and is a sectional view taken along the clutch plate 86. As illustrated in FIG. 6, the inner wall 62 of the base plate 60 extends along the outer peripheral surface of the second cylinder portion 52 of the fixing gear 50 and is located between the clutch gear 81 and the second cylinder portion 52. Therefore, the movement of the clutch gear 81 in the radial direction is restricted by the inner wall 62. Further, the base plate 60 is rotatable in the circumferential direction about the first rotation axis 41*c* with respect to the fixing gear 50. When the base plate 60 rotates, the substrate 70 and the shaft 45 attached to the base plate 60 also rotate together with the base plate 60.

As illustrated in FIGS. 3 and 4, the switching gear 90 is a cylindrical member extending along the first rotation axis 41*c*, and is located opposite the base plate 60 side with respect to the clutch gear 81. The internal space of the switching gear 90 accommodates the first cylinder portion 51 of the fixing gear 50. The switching gear 90 includes a plurality of first cutouts 91 and a plurality of second cutouts 92 extending from the end on the clutch gear 81 side to the opposite side of the clutch gear 81 side. The first cutout 91 corresponds to the protruding portion 54 provided at the fixing gear 50, and the protruding portion 54 protrudes outward from the first cutout 91. The second cutout 92 corresponds to the protrusion 83 of the clutch gear 81, and the protrusion 83 is fitted into the second cutout 92. Therefore, when the switching gear 90 rotates about the first rotation axis 41*c*, the clutch gear 81 also rotates together with the switching gear 90. An internal gear 93 is provided at an end portion opposite the base plate 60 side on the inner peripheral surface of the switching gear 90.

The first gearbox unit 110 includes a first carrier 111, a second carrier 112, a pair of first planetary gears 113, a pair of second planetary gears 114, and an input member 115. The first carrier 111 and the second carrier 112 are annular plate members each extending in a direction perpendicular to the first rotation axis 41*c*. The first carrier 111 and the second carrier 112 oppose each other at a predetermined interval, and the first carrier 111 is located on the clutch gear 81 side with respect to the second carrier 112. The second carrier 112 includes a plurality of shafts 112*a* extending toward the first carrier 111, having the distal end portion fixed to the first carrier 111, and being parallel to the first rotation axis 41*c*. Therefore, the second carrier 112 is fixed to the first carrier 111. The first carrier 111 includes a plurality of shafts 111*a* extending toward the second carrier 112, having the distal end portion fixed to a carrier 115*a* of the input member 115 to be described below, and being parallel to the first rotation axis 41*c*. The first carrier 111 includes a plurality of weight-reducing holes 111*h*.

The pair of first planetary gears 113 are spur gears meshing with the internal gear 53 of the fixing gear 50. Each of the first planetary gears 113 is rotatably supported by one shaft 112*a* among the plurality of shafts 112*a*.

The input member 115 includes a disk-shaped carrier 115*a* located opposite the first carrier 111 side with respect to the second carrier 112 and extending in a direction perpendicular to the first rotation axis 41*c*, and a spur gear 115*b* provided on the surface of the carrier 115*a* opposite the second carrier 112 side in a protruding manner. The center of the carrier 115*a* and the center of the spur gear 115*b* coincide with the first rotation axis 41*c*. As described above, the distal end portion of the shaft 111*a* of the first carrier 111 is fixed to the carrier 115*a*. Therefore, the input member 115 is fixed to the first carrier 111. A shaft 115*c* extending along the first rotation axis 41*c* is provided on the surface of the spur gear 115*b* opposite the carrier 115*a* side, and the shaft 115*c* is rotatably supported by a bottom wall 41*a* of the first output member 41 to be described later. Therefore, the rotation axis of the input member 115 coincides with the first rotation axis 41*c*.

The pair of second planetary gears 114 is located between the first carrier 111 and the carrier 115*a*. The second planetary gear 114 includes a first spur gear 114*a* and a second spur gear 114*b* that is provided on the surface of the first spur gear 114*a* on the first carrier 111 side in a protruding manner and has the center in coincidence with the center of the first spur gear 114*a*. The first spur gear 114*a* is meshed with the spur gear 66 fixed to the output shaft of the motor 65, and the second spur gear 114*b* is meshed with the first planetary gear 113. Each of the second planetary gears 114 is rotatably supported by one shaft 111*a* among the plurality of shafts 111*a*.

As illustrated in FIG. 5, the first carrier 111, the second carrier 112, the pair of first planetary gears 113, and the pair of second planetary gears 114 in the first gearbox unit 110 as described above are located in the internal space of the first cylinder portion 51 in the fixing gear 50, and the input member 115 is located in the internal space of the switching gear 90.

As illustrated in FIGS. 3 and 4, the first output member 41 includes the bottom wall 41*a*, the shaft portion 41*b*, and an outer peripheral wall 41*e*. The bottom wall 41*a* is a disk-shaped member extending in a direction perpendicular to the first rotation axis 41*c*, and is located opposite the base plate 60 side with respect to the switching gear 90. A hole 41*h* into which the shaft 115*c* of the input member 115 is inserted is formed at the bottom wall 41*a*. The shaft portion 41*b* is a cylindrical member extending along the first rotation axis 41*c* from the surface of the bottom wall 41*a* opposite the base plate 60 side. The shaft portion 41*b* is inserted into the through-hole 34*h* of the bottom wall 34 of the left case portion 32, and a part of the shaft portion 41*b* is exposed to the outside. The outer peripheral wall 41*e* is a cylindrical member extending toward the clutch gear 81 along the outer peripheral edge portion of the bottom wall 41*a*. An end of the outer peripheral wall 41*e* on the base plate 60 side opposes the surface of the base plate 60 on the fixing gear 50 side. The outer peripheral wall 41*e* includes a plurality of first cutouts 41*d* and a plurality of second cutouts 41*f* each extending from the end on the base plate 60 side to the bottom wall 41*a* side. The first cutout 41*d* corresponds to the first protruding portion 87 of the clutch plate 86, and the first protruding portion 87 protrudes from the first cutout 41*d*. The second cutout 41*f* corresponds to the outer wall 61 of the base plate 60, and the outer wall 61 is fitted into the second cutout 41*f*. Therefore, when the first output member 41 rotates about the first rotation axis 41*c*, the base plate 60 also rotates together with the first output member 41.

Figure 7:
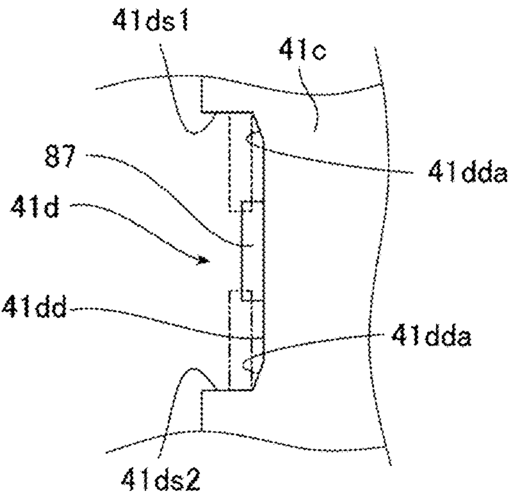
FIG. 7 is a view illustrating a cutout.

FIG. 7 is a view illustrating the first cutout 41*d*, and is a view of the first cutout 41*d* as viewed from a direction perpendicular to the first rotation axis 41*c*. As illustrated in FIG. 7, the first cutout 41*d* has a substantially quadrangular shape. The end surface of the outer peripheral wall 41*e* defining the first cutout 41*d* includes a pair of side portions 41*ds*1 and 41*ds*2 extending in a direction parallel to the first rotation axis 41*c* and opposing each other, and a bottom portion 41*dd* that is a distal end in the cutout direction and extends in the circumferential direction around the first rotation axis 41*c*. The bottom portion 41*dd* includes inclined portions 41*dda* inclined toward the opposite side of the bottom wall 41*a* side and toward the side portions 41*ds*1 and 41*ds*2 at both end portions in the circumferential direction. Therefore, the depth of the first cutout 41*d* gradually decreases toward the side portions 41*ds*1 and 41*ds*2 at or near the side portions 41*ds*1 and 41*ds*2. In the initial state, the first protruding portion 87 of the clutch plate 86 is located at the center of the bottom portion 41*dd* in the circumferential direction, extends along the bottom portion 41*dd*, and is separated from the inclined portion 41*dda* of the bottom portion 41*dd*.

As illustrated in FIGS. 3 and 4, the second gearbox unit 120 includes a carrier 121 and three planetary gears 122, and is disposed between the bottom wall 41*a* of the first output member 41 and the carrier 115*a* of the input member 115. The carrier 121 is an annular plate member extending in a direction perpendicular to the first rotation axis 41*c*, and opposes the carrier 121 and the bottom wall 41*a* at a predetermined interval. The carrier 121 includes a plurality of shafts 121*a* extending toward the bottom wall 41*a*, having the distal end portion fixed to the bottom wall 41*a*, and being parallel to the first rotation axis 41*c*. Therefore, the carrier 121 is fixed to the bottom wall 41*a*. The carrier 121 includes a plurality of weight-reducing holes 121*h*.

The three planetary gears 122 are spur gears each meshing with the spur gear 115*b* of the input member 115. Each of the planetary gears 122 is rotatably supported by one shaft 121*a* among the plurality of shafts 121*a*.

As illustrated in FIGS. 3 and 4, the second output member 42 is a cylindrical member extending along the second rotation axis 42*c*, and extends in the up-down direction in the present embodiment. The second output member 42 is disposed below the outer peripheral wall 41*e* of the first output member 41. As illustrated in FIG. 5, the central portion in the extending direction of the second output member 42 is surrounded by the lower wall 25 of the right case portion 22 and the lower wall 35 of the left case portion 32. The second output member 42 is supported by the lower wall 25 and the lower wall 35 so as to be rotatable about the second rotation axis 42*c*. A bevel gear 42*a* meshed with the gear portion 82 of the clutch gear 81 is provided at an end portion of the second output member 42 on the first rotation axis 41*c* side. The end portion of the second output member

42 opposite the first rotation axis 41*c* is not surrounded by the lower wall 25 and the lower wall 35 and is exposed to the outside.

Next, the operation of the actuator 20 will be described.

The power transmission n switching unit 80 of the actuator 20 switches between a state in which the first output member 41 rotates and a state in which the second output member 42 rotates by the torque of the input member 115. The actuator 20 can rotate the first output member 41 or rotate the second output member 42 by the one motor 65.

Figure 8:
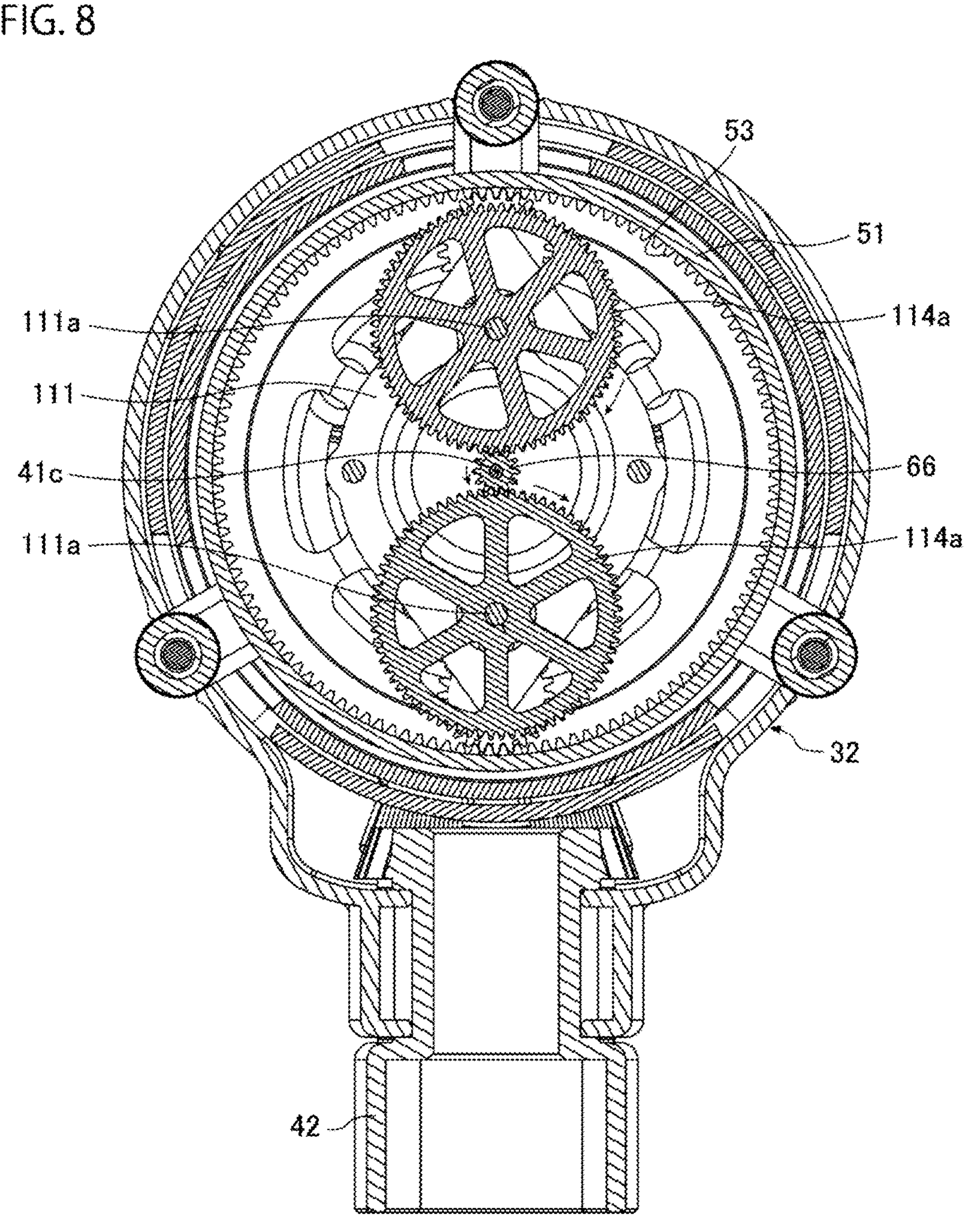
FIG. 8 is a sectional view of the actuator, taken along line VIII-VIII in FIG. 5.
Figure 9:
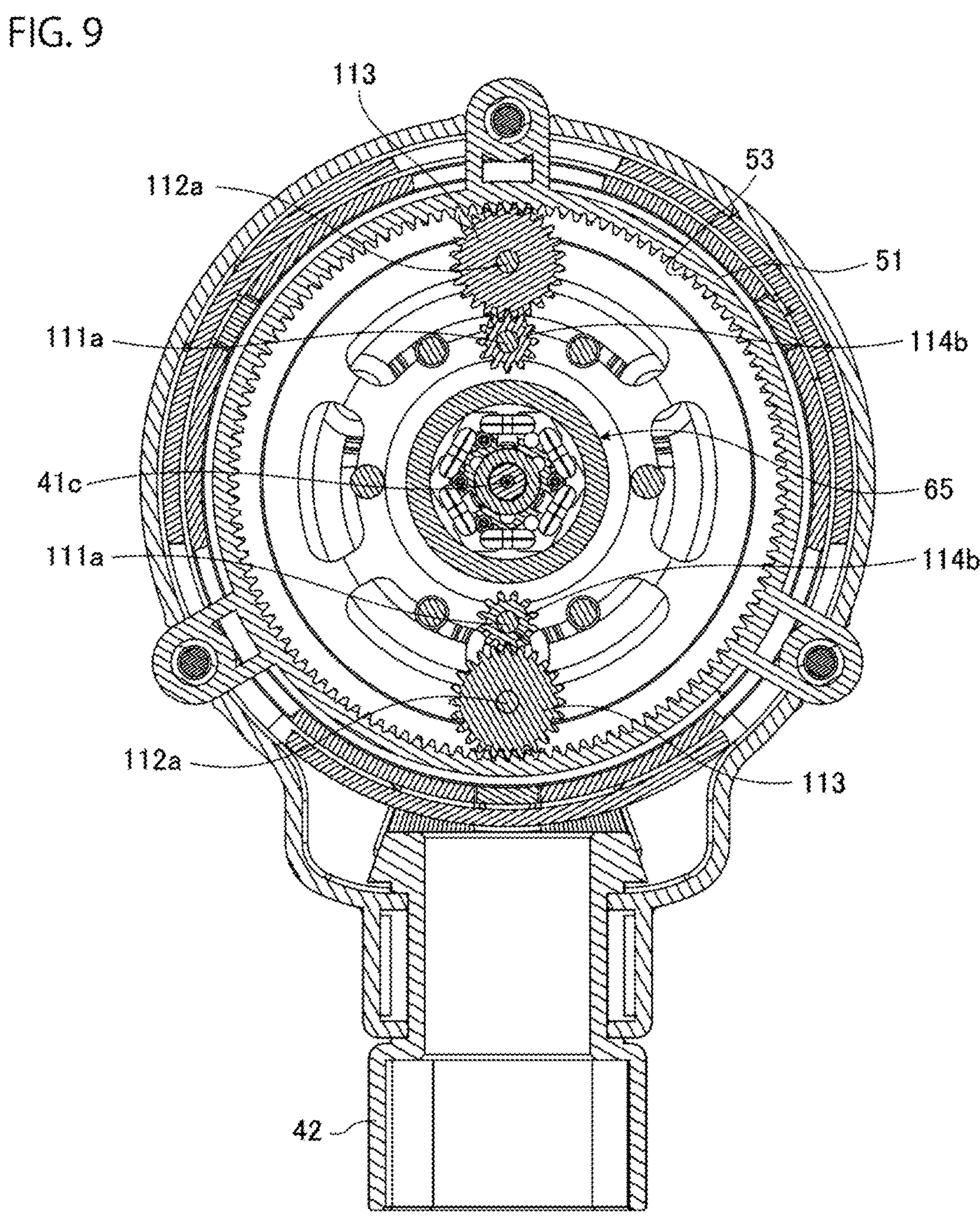
FIG. 9 is a sectional view of the actuator, taken along line IX-IX in FIG. 5.
Figure 10:
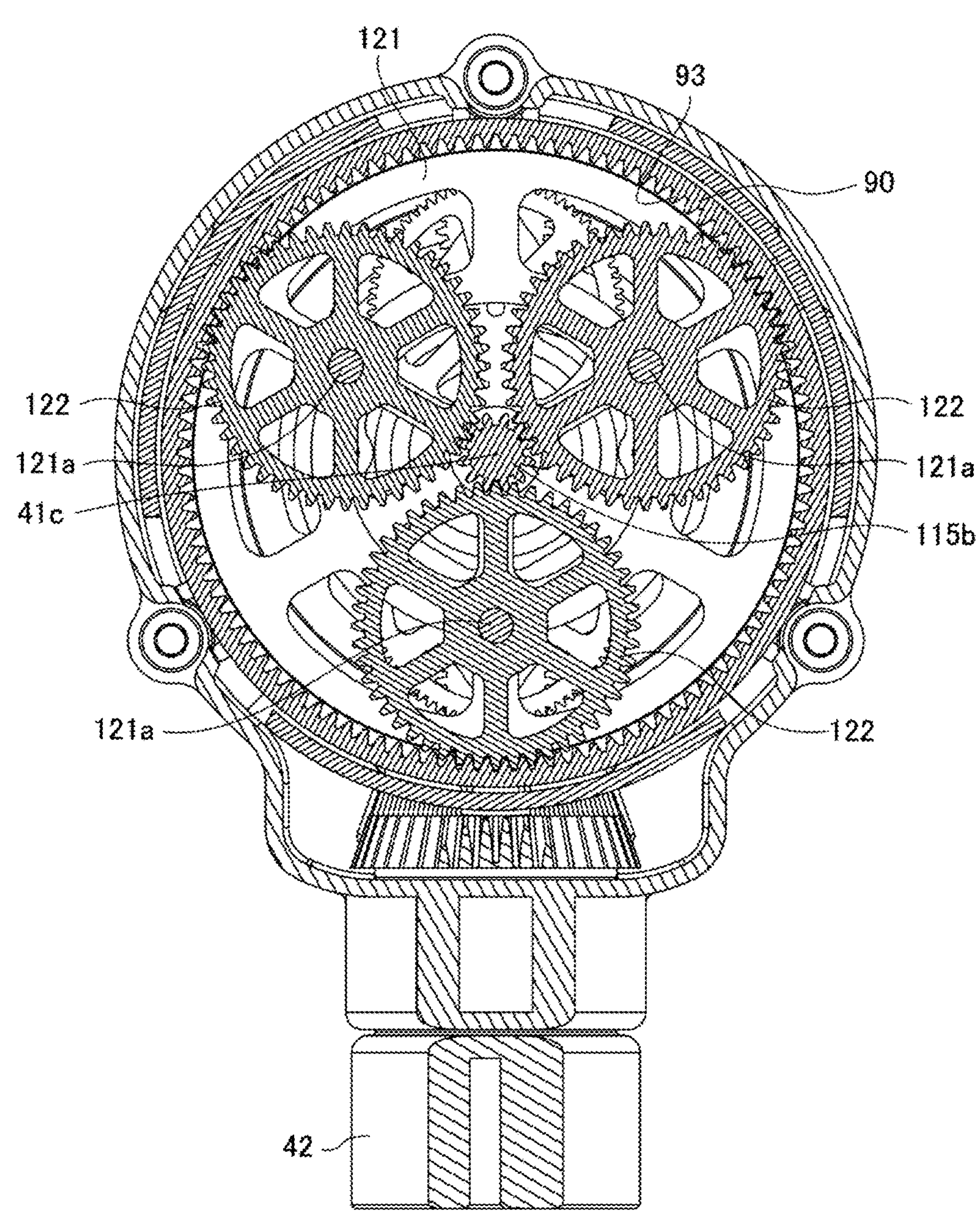
FIG. 10 is a sectional view of the actuator, taken along line X-X in FIG. 5.

FIG. 8 is a sectional view of the actuator 20, taken along line VIII-VIII in FIG. 5, and is a sectional view taken along the spur gear 66 fixed to the output shaft of the motor 65. FIG. 9 is a sectional view of the actuator 20, taken along line IX-IX in FIG. 5, and is a sectional view taken along the first planetary gear 113 of the first gearbox unit 110. FIG. 10 is a sectional view of the actuator 20, taken along line X-X in FIG. 5, and is a sectional view taken along the spur gear 115*b* of the input member 115. As illustrated in FIG. 6, FIGS. 8 to 10 are views in an initial state in which the first protruding portion 87 of the clutch plate 86 is located at the center of the bottom portion 41*dd* in the circumferential direction around the first rotation axis 41*c*. The rotation angles of the first output member 41 and the second output member 42 in the initial state are set to zero.

In such an initial state, when the spur gear 66 illustrated in FIG. 8 rotates clockwise by the torque of the motor 65, the first spur gear 114*a* of the second planetary gear 114 rotates counterclockwise about the shaft 111*a*, and the second spur gear 114*b* illustrated in FIG. 9 also rotates counterclockwise about the shaft 111*a*. When the second spur gear 114*b* rotates counterclockwise, the first planetary gear 113 rotates clockwise about the shaft 112*a*. The first planetary gear 113 revolves counterclockwise around the first rotation axis 41*c* to mesh with the internal gear 53 of the fixing gear 50. The first planetary gear 113 is supported by the shaft 112*a* of the second carrier 112, the second carrier 112 is fixed to the first carrier 111, and the input member 115 is fixed to the first carrier 111. Therefore, the first carrier 111, the second carrier 112, and the input member 115 rotate integrally. That is, the torque of the motor 65 is transmitted to the input member 115 via the spur gear 66, the first spur gear 114*a*, the second spur gear 114*b*, the first planetary gear 113, and the internal gear 53. Then, the spur gear 115*b* of the input member 115 illustrated in FIG. 10 rotates counterclockwise about the first rotation axis 41*c*.

Although detailed description is omitted, when the spur gear 66 illustrated in FIG. 8 rotates counterclockwise by the torque of the motor 65, the direction of the torque transmitted to the input member 115 is reversed, and the spur gear 115*b* of the input member 115 illustrated in FIG. 10 rotates clockwise about the first rotation axis 41*c*. Hereinafter, among the types of rotation of the spur gear 115*b*, the counterclockwise rotation of the spur gear 115*b* at the viewpoint of FIG. 10 is defined as the forward rotation of the input member 115, and the clockwise rotation of the spur gear 115*b* at this viewpoint is defined as the backward rotation of the input member 115.

When the input member 115 rotates forward and the spur gear 115*b* rotates counterclockwise, the planetary gears 122 rotate clockwise about the respective shafts 121*a*, and torque is transmitted to the internal gear 93 of the switching gear 90 meshed with the planetary gears 122. Since the protrusion 83 of the clutch gear 81 is fitted in the second cutout 92 of the switching gear 90, the torque is also transmitted to the clutch gear 81. The clutch gear 81 is pressed against the fixing gear 50 by the elastic force of the clutch spring 89, and the clutch gear 81 is prevented from rotating in the circumferential direction about the first rotation axis 41*c* with respect to the fixing gear 50. Therefore, when the planetary gears 122 rotate, the switching gear 90 does not rotate, and the planetary gears 122 revolve counterclockwise around the first rotation axis 41*c* in the counterclockwise direction. Since the shaft 121*a* supporting the planetary gear 122 is fixed to the bottom wall 41*a* of the first output member 41, the first output member 41 rotates counterclockwise about the first rotation axis 41*c* in the viewpoint of FIG. 10. Hereinafter, the counterclockwise rotation of the first output member 41 at the viewpoint of FIG. 10 is defined as the forward rotation of the first output member 41. Since the outer wall 61 of the base plate 60 is fitted in the second cutout 41*f* of the outer peripheral wall 41*e* of the first output member 41, the base plate 60, the substrate 70, and the shaft 45 also rotate forward together with the first output member 41.

Figure 11:
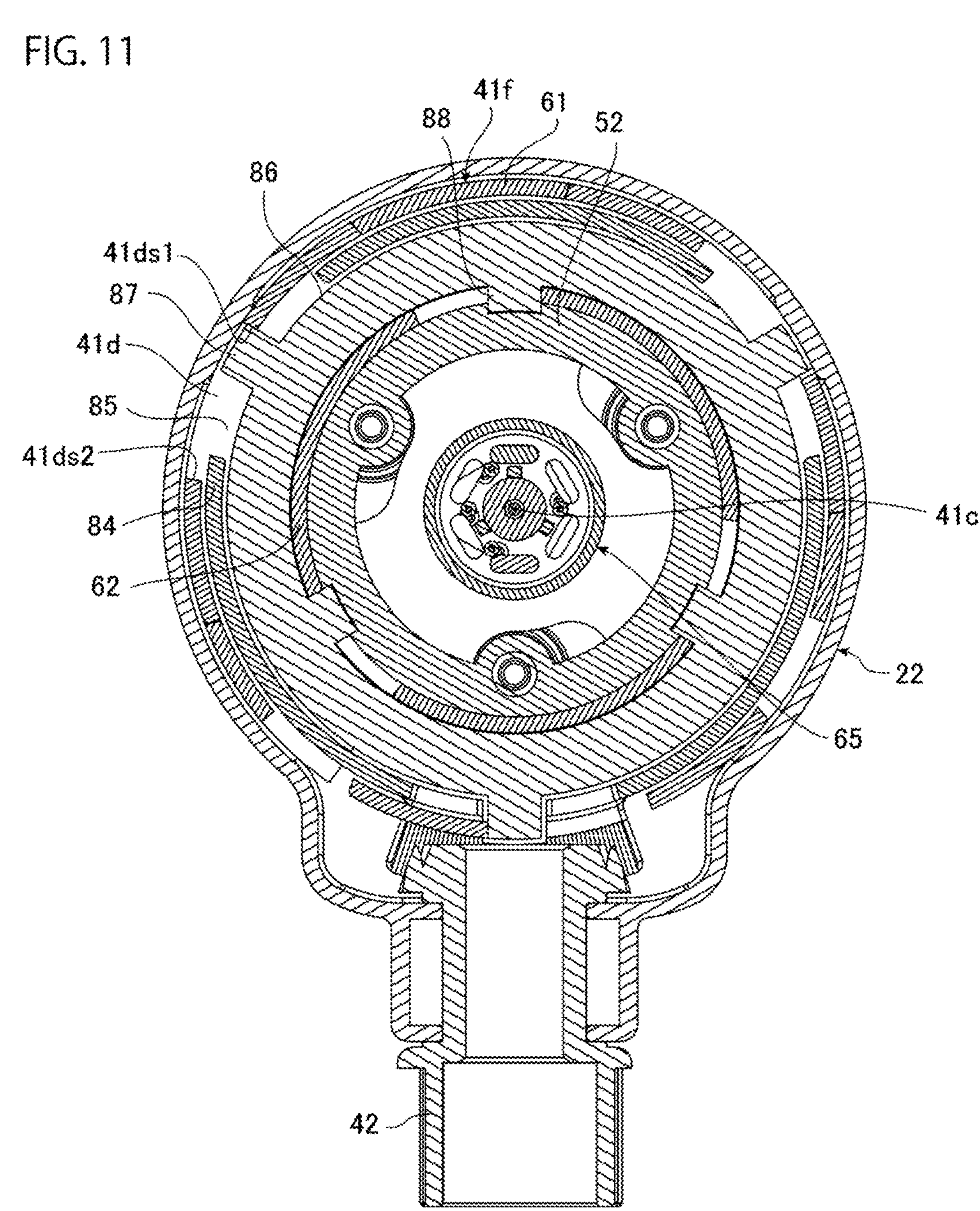
FIG. 11 is a sectional view of the actuator in the state where a first output member is rotated forward from an initial state, illustrated in the same manner as FIG. 6.

FIG. 11 is a sectional view of the actuator 20 in the state where the first output member 41 rotates forward from an initial state, illustrated in the same manner as FIG. 6. The clutch plate 86 is prevented from rotating in the circumferential direction with respect to the fixing gear 50. Therefore, when the first output member 41 rotates forward, the first protruding portion 87 comes close to one side portion 41*ds*1 of the first cutout 41*d*, and the first protruding portion 87 comes into contact with the one side portion 41*ds*1 as illustrated in FIG. 11.

Figure 12:
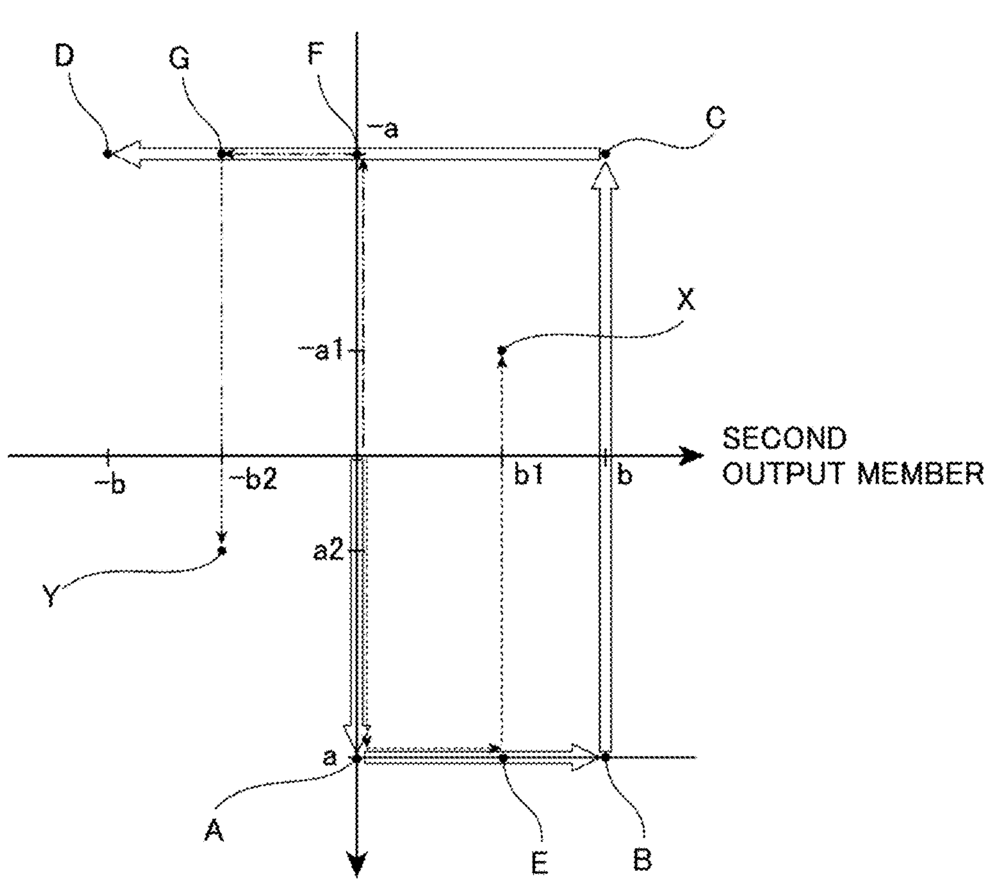
FIG. 12 is a graph indicating a relationship between a rotation angle of the first output member and a rotation angle of a second output member.

FIG. 12 is a graph indicating a relationship between a rotation angle of the first output member 41 and a rotation angle of the second output member 42. In FIG. 12, the vertical axis represents the rotation angle of the first output member 41, and the horizontal axis represents the rotation angle of the second output member 42. In FIG. 12, the downward change is a change in which the first output member 41 rotates forward, the upward change is a change in which the first output member 41 rotates backward, the rightward change is a change in which the second output member 42 rotates forward, and the leftward change is a change in which the second output member 42 rotates backward. Note that the clockwise rotation of the second output member 42 at the viewpoint viewed from below along the second rotation axis 42*c* is defined as the forward rotation of the second output member 42.

The state as described above, in which the first protruding portion 87 is in contact with the one side portion 41*ds*1 is a state A as illustrated in FIG. 12. The state A is a state in which the rotation angle of the first output member 41 is a degrees and the rotation angle of the second output member 42 is zero degrees. Note that FIG. 12 illustrates an open arrow indicating a change in the state of the actuator 20. As described above, the bottom portion 41*dd* of the first cutout 41*d* includes the inclined portion 41*dda*. Therefore, in the state A, the first protruding portion 87 is pushed in a direction away from the fixing gear 50 against the elastic force of the clutch spring 89 by the inclined portion 41*dda*. Then, the clutch plate 86 is separated from the clutch gear 81, the force pressing the clutch gear 81 against the fixing gear 50 decreases, and the clutch gear 81 changes to be rotatable in the circumferential direction around the first rotation axis 41*c* with respect to the fixing gear 50. In FIG. 7, the first protruding portion 87 in contact with the one side portion 41*ds*1 is indicated by a dotted line.

When the input member 115 is further rotated forward in the state A in which the first protruding portion 87 is in contact with the one side portion 41*ds*1 in this manner, the first output member 41 cannot be rotated forward due to the first protruding portion 87. Therefore, the planetary gears 122 illustrated in FIG. 10 do not revolve around the first rotation axis 41*c*, and the switching gear 90 rotates clockwise by the torque from the input member 115. The clutch gear 81 also is rotated clockwise.

Figure 13:
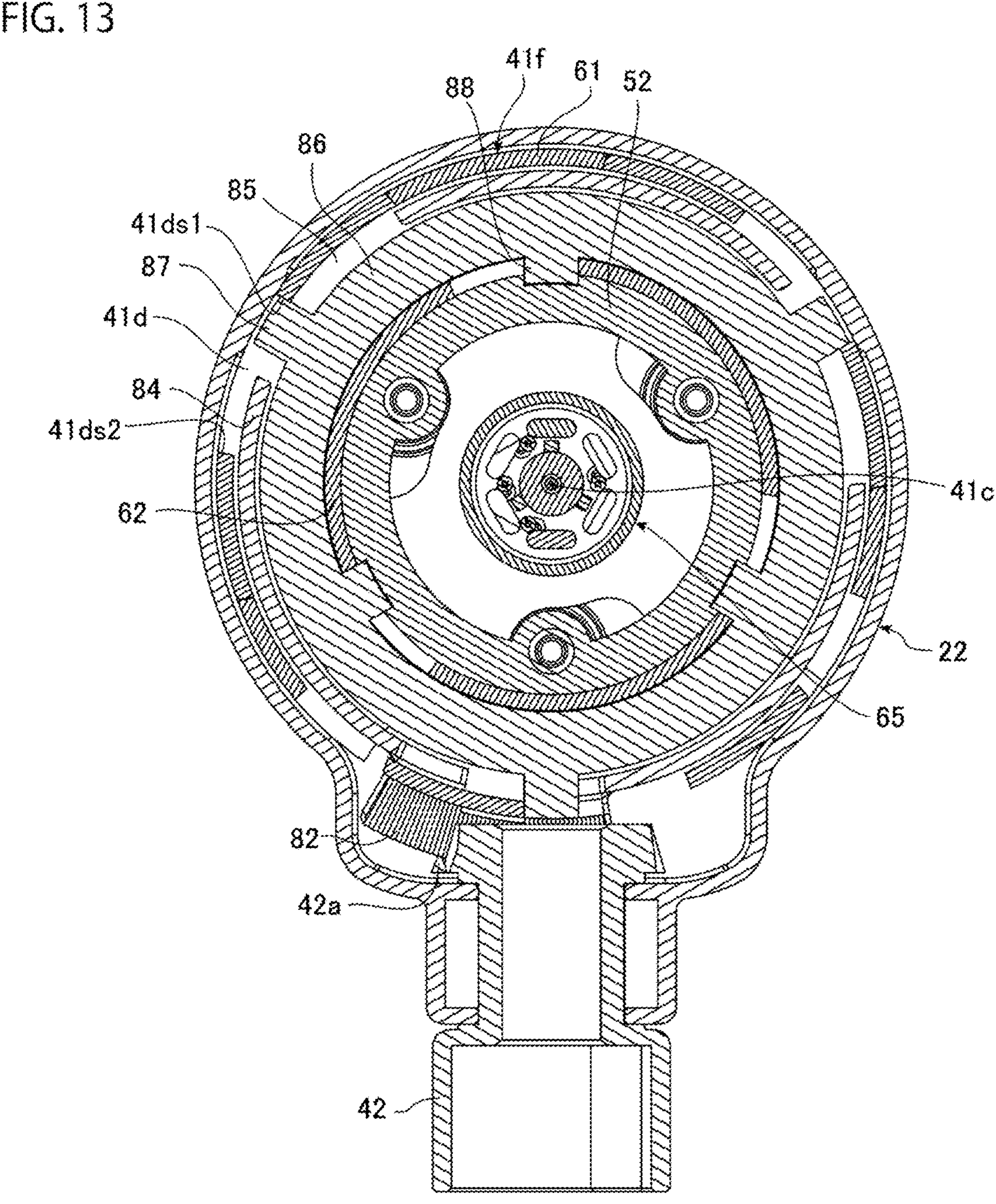
FIG. 13 is a view of a state where the second output member is rotated about a second rotation axis, illustrated in the same manner as FIG. 6.

FIG. 13 is a sectional view of the actuator 20 in the state in which the clutch gear 81 has rotated, illustrated in the same manner as FIG. 6. As illustrated in FIG. 13, the clutch gear 81 rotates clockwise, whereby the second output member 42 rotates forward about the second rotation axis 42*c*. When the clutch gear 81 rotates in this manner, the gear portion 82 of the clutch gear 81 approaches the right case portion 22. The gear portion 82 in contact with the right case portion 22 cause the clutch gear 81 not to rotate clockwise and the second output member 42 not to rotate forward. As illustrated in FIG. 12, the state of the actuator 20 transitions to a state B in which the rotation angle of the first output member 41 is a degrees and the rotation angle of the second output member 42 is b degrees.

In the state B, when the rotation direction of the motor is reversed and the input member 115 is rotated backward, the first output member 41 is rotated backward by the torque from the input member 115, the first protruding portion 87 is separated from the one side portion 41*ds*1, and the clutch plate 86 is pressed against the clutch gear 81 by the elastic force of the clutch spring 89. Then, the rotation of the clutch gear 81 with respect to the fixing gear 50 is prevented. Therefore, the first output member 41 rotates backward in a state in which the rotation angle of the second output member 42 is b degrees. Then, the first output member 41 rotates backward, whereby the first protruding portion 87 comes close to the other side portion 41*ds*2 of the first cutout 41*d*, and the first protruding portion 87 comes into contact with the other side portion 41*ds*2. This causes the first output member 41 not to rotate backward, and the state of the actuator 20 transitions to a state C in which the rotation angle of the first output member 41 is −a degrees and the rotation angle of the second output member 42 is b degrees. In the state C, similarly to the case in the state A, the clutch plate 86 is separated from the clutch gear 81 due to the inclined portion 41*dda*, and the clutch gear 81 changes to be rotatable in the circumferential direction around the first rotation axis 41*c* with respect to the fixing gear 50. In FIG. 7, the first protruding portion 87 in contact with the other side portion 41*ds*2 is indicated by a two-dot chain line.

When the input member 115 is further rotated backward in the state C in which the first protruding portion 87 is in contact with the other side portion 41*ds*2 in this manner, the first output member 41 cannot be rotated backward due to the first protruding portion 87. Therefore, the planetary gears 122 illustrated in FIG. 10 do not revolve around the first rotation axis 41*c*, and the switching gear 90 is rotated counterclockwise by the torque from the input member 115. Then, the clutch gear 81 also rotates counterclockwise, and the second output member 42 rotates backward about the second rotation axis 42*c*. When the clutch gear 81 rotates in this manner, the gear portion 82 of the clutch gear 81 approaches the right case portion 22. The gear portion 82 in contact with the right case portion 22 causes the clutch gear 81 not to rotate counterclockwise and the second output member 42 not to rotate backward. As illustrated in FIG. 12, the state of the actuator 20 transitions to a state D in which the rotation angle of the first output member 41 is −a degrees and the rotation angle of the second output member 42 is −b degrees.

In the actuator 20 operating in this manner, for example, the state of the actuator 20 can be changed from the initial state to a state X illustrated in FIG. 12 by changing the rotation of the input member 115 as follows. FIG. 12 illustrates the change until the transition to the state X is completed using a dotted arrow. In the state X, the rotation angle of the first output member 41 is −a1 degrees smaller than zero degrees and larger than −a degrees, and the rotation angle of the second output member 42 is b1 degrees larger than zero degrees and smaller than b degrees. First, the first output member 41 is rotated forward by rotating the input member 115 forward, the first protruding portion 87 is brought into contact with the one side portion 41*ds*1, and the state of the actuator 20 is brought into the state A. Next, the second output member 42 is rotated forward by further rotating the input member 115 forward, and the state of the actuator 20 is brought into a state E in which the rotation angle of the second output member 42 is b1 degrees. Next, the first output member 41 is rotated backward by rotating the input member 115 backward, whereby the rotation angle of the first output member 41 is set to −a1 degrees. In this way, the state of the actuator 20 can be brought into the state X.

Note that the state of the actuator 20 can be changed from the initial state to the state X also by another method. In this other method, first, the input member 115 is rotated forward to bring the state of the actuator 20 into the state B via the state A. Next, the state of the actuator 20 is brought into the state C by rotating the input member 115 backward, and the rotation angle of the second output member 42 is set to b1 degrees by further rotating the input member 115 backward. Next, the rotation angle of the first output member 41 is set to −a1 degrees by rotating the input member 115 forward. The state of the actuator 20 can be brought into the state X also by the method as described above.

The state of the actuator 20 can be changed from the initial state to a state Y illustrated in FIG. 12 by changing the rotation of the input member 115 as follows. Note that FIG. 12 illustrates the change until the transition to the state Y is completed using a two-dot chain arrow. In the state Y, the rotation angle of the first output member 41 is a2 degrees larger than zero degrees and smaller than a degrees, and the rotation angle of the second output member 42 is −b2 degrees smaller than zero degrees and larger than −b degrees. First, the first output member 41 is rotated backward by rotating the input member 115 backward, and the state of the actuator 20 is brought into a state F in which the first protruding portion 87 is in contact with the other side portion 41*ds*2. This allows the second output member 42 to rotate backward. Next, the second output member 42 is rotated backward by further rotating the input member 115 backward, and the state of the actuator 20 is brought into a state G in which the rotation angle of the second output member 42 is −b2 degrees. Next, the first output member 41 is rotated forward by rotating the input member 115 forward, whereby the rotation angle of the first output member 41 is set to a2 degrees. In this way, the state of the actuator 20 can be brought into the state Y.

Note that he state of the actuator 20 can be changed from the initial state to the state Y also by another method. In this other method, first, the input member 115 is rotated forward to bring the state of the actuator 20 into the state B via the state A. Next, the state of the actuator 20 is brought into the state C by rotating the input member 115 backward, and the rotation angle of the second output member 42 is set to −b2 degrees by further rotating the input member 115 backward. Next, the rotation angle of the first output member 41 is changed to a2 degrees by rotating the input member 115 forward. The state of the actuator 20 can be brought into the state Y also by the method as described above.

As described above, in the actuator 20 of the present embodiment, the first protruding portion 87 comes into contact with the one side portion 41*ds*1 in the state in which the input member 115 rotates forward, whereby the state of the actuator 20 is switched from the state in which the first output member 41 rotates forward to the state in which the second output member 42 rotates forward. In addition, the first protruding portion 87 comes into contact with the other side portion 41*ds*2 in the state in which the input member 115 rotates backward, whereby the state of the actuator 20 is switched from the state in which the first output member 41 rotates backward to the state in which the second output member 42 rotates backward. In a state in which the first protruding portion 87 is not in contact with the one side portion 41*ds*1 or the other side portion 41*ds*2, the clutch gear 81 is pressed against the fixing gear 50. Thus, the first output member 41 rotates forward in line with the forward rotation of the input member 115, and the first output member 41 rotates backward in line with the backward rotation of the input member 115.

That is, to ensure such a mechanism, the power transmission switching unit 80 changes the connection state between the first output member 41 and the input member 115 as well as between the second output member 42 and the input member 115 depending on the rotation state of the input member 115. It can be understood that the power transmission switching unit 80 changes the connection state in accordance with a first rotation state, a second rotation state, and a third rotation state described below.

The first rotation state is, for example, a state from the initial state to the state A or the state F, and is a state in which the rotation angle of the input member 115 is within a predetermined range. The upper limit of the predetermined range is the rotation angle of the first output member 41 when the first protruding portion 87 is brought into contact with the one side portion 41*ds*1 of the first cutout 41*d*. The lower limit of the predetermined range is the rotation angle of the first output member 41 when the first protruding portion 87 is brought into contact with the other side portion 41*ds*2 of the first cutout 41*d*. In the first rotation state, the power transmission switching unit 80 connects the input member 115 and the first output member 41 to establish a first connection state so that the first output member 41 rotates forward in line with the forward rotation of the input member 115 as well as the first output member 41 rotates backward in line with the backward rotation of the input member 115.

The second rotation state is, for example, a state from the state A to the state B or the state E, and is a state in which the input member 115 rotates forward by an angle exceeding the upper limit of the above predetermined range. In the second rotation state, the power transmission switching unit 80 establishes a second connection state in which the input member 115 and the second output member 42 are connected to each other so that the second output member 42 rotates forward in line with the forward rotation of the input member 115.

When the input member 115 rotates backward in the second connection state, for example, when the input member 115 rotates backward in the state B or the state E, the power transmission switching unit 80 establishes the first connection state in which the above predetermined range is shifted to the forward rotation side of the input member 115 by a specific angle. This specific angle refers to an angle from the upper limit of the predetermined range to the rotation angle of the input member 115 when the input member 115 rotates backward.

The third rotation state is, for example, a state from the state C to the state D and from the state F to the state G, and is a state in which the input member 115 rotates backward by an angle falling below the lower limit of the above predetermined range. In the third rotation state, the power transmission switching unit 80 establishes a third connection state in which the input member 115 and the second output member 42 are connected to each other so that the second output member 42 rotates backward in line with the backward rotation of the input member 115.

When the input member 115 rotates forward in the third connection state, for example, when the input member 115 rotates forward in the state G, the power transmission switching unit 80 establishes the first connection state in which the above predetermined range is shifted to the backward rotation side of the input member 115 by another specific angle. This other specific angle refers to an angle from the lower limit of the predetermined range to the rotation angle of the input member 115 when the input member 115 rotates forward.

In this way, in the actuator 20 of the present embodiment, the first output member 41 can be rotated forward or backward, the second output member 42 can be rotated forward or backward, and the orientations in the up-down direction and the left-right direction of the lamp unit 15 can be set to desired orientations, by the one motor 65. In the present embodiment, before shipping or during inspection of the vehicle to which the vehicle headlamp 1 is attached, the control unit 72 adjusts the orientation of the lamp unit 15 by controlling the motor 65.

As described above, in the first rotation state in which the rotation angle of the input member 115 is within the predetermined range, the power transmission switching unit 80 of the actuator 20 of the present embodiment connects the input member 115 and the first output member 41 to establish the first connection state so that the first output member 41 rotates forward in line with the forward rotation of the input member 115 as well as the first output member 41 rotates backward in line with the backward rotation of the input member 115. In the second rotation state in which the input member 115 rotates forward by an angle exceeding the upper limit of the above predetermined range, the power transmission switching unit 80 connects the input member 115 and the second output member 42 to establish the second connection state so that the second output member 42 rotates forward in line with the forward rotation of the input member 115. In the third rotation state in which the input member 115 rotates backward by an angle falling below the lower limit of the above predetermined range, the power transmission switching unit 80 connects the input member 115 and the second output member 42 to establish the third connection state so that the second output member 42 rotates backward in line with the backward rotation of the input member 115. When the input member 115 rotates backward in the second connection state, the power transmission switching unit 80 establishes the first connection state in which the above predetermined range is shifted to the forward rotation side of the input member 115 by the angle from the upper limit of the predetermined range to the rotation angle of the input member 115 when the input member 115 rotates backward. When the input member 115 rotates forward in the third connection state, the power transmission switching unit 80 establishes the first connection state in which the above predetermined range is shifted to the backward rotation side of the input member 115 by the angle from the lower limit of the predetermined range to the rotation angle of the input member 115 when the input member 115 rotates forward.

Therefore, in the actuator 20 of the present embodiment, the rotation angle of the first output member 41 can be set to the desired rotation angle while setting the rotation angle of the second output member 42 to the desired rotation angle by setting the rotation angle of the second output member 42 to the desired rotation angle in the second connection state and then rotating the input member 115 backward to establish the first connection state, or by setting the rotation angle of the second output member 42 to the desired rotation angle in the third connection state and then rotating the input member 115 forward to establish the first connection state. The vehicle headlamp 1 as the on-vehicle device of the present embodiment includes the actuator 20, the lamp unit 15 that emits light toward the front of the vehicle, as the electronic device attached to the first output member 41 of the actuator, and the support member 19 that supports the second output member 42. Therefore, according to the vehicle headlamp 1 of the present embodiment, the orientation of the lamp unit 15 can be changed in two directions non-parallel to each other by one motor. In the present embodiment, the first rotation axis 41*c* extends in the horizontal direction, and the second rotation axis 42*c* extends in the vertical direction. Then, the emission direction of the light emitted from the lamp unit 15 is changed in the up-down direction by the rotation of the first output member 41, and the emission direction of the light emitted from the lamp unit 15 changes in the left-right direction by the rotation of the second output member 42.

In addition, the actuator 20 of the present embodiment further includes the substrate 70 on which the sensor 71 that detects inclination is mounted and which rotates together with the first output member 41. Therefore, according to the actuator 20 of the present embodiment, the rotation angle of the first output member 41 can be detected. In the vehicle headlamp 1 of the present embodiment, the second output member 42 is supported by the support member 19, and the lamp unit 15 is attached to the first output member 41. Therefore, according to the vehicle headlamp 1 of the present embodiment, the orientation of the lamp unit 15 in two directions non-parallel to each other can be detected. Note that the sensor 71 may not be mounted on the substrate 70, and the substrate 70 may not rotate together with the first output member 41.

In the actuator 20 of the present embodiment, the substrate 70 extends in a direction perpendicular to the first rotation axis 41*c*. Therefore, according to the actuator 20 of the present embodiment, the rotation angle of the first output member 41 can be detected more accurately. Note that the substrate 70 may extend in a direction non-perpendicular to the first rotation axis 41*c*.

In the actuator 20 of the present embodiment, the rotation axis of the input member 115 and the first rotation axis 41*c* coincide with each other. Therefore, according to the actuator 20 of the present embodiment, the power transmission switching unit 80 can avoid having a complicated configuration as compared with the case in which the rotation axis of the input member 115 does not coincide with the first rotation axis 41*c*. Note that the rotation axis of the input member 115 and the first rotation axis 41*c* may not coincide with each other.

The actuator 20 of the present embodiment further includes the shaft 45 that extends along the first rotation axis 41*c* and rotates together with the first output member 41. The first output member 41 includes the shaft portion 41*b* extending along the first rotation axis 41*c* opposite the shaft 45 side in the direction along the first rotation axis 41*c*. According to the actuator 20 of the present embodiment, the lamp unit 15 as an electronic device can be attached to the shaft 45 and the shaft portion 41*b* of the first output member 41. With this configuration, a load applied to the first output member 41 can be reduced, and durability can be improved.

Although the present invention has been described with reference to the above embodiment as an example, the present invention is not limited thereto.

For example, the above embodiment describes as an example the vehicle headlamp 1 as the on-vehicle device including the actuator 20, the lamp unit 15 as an electronic device attached to the first output member 41 of the actuator 20, and the support member 19 that supports the second output member 42. However, the on-vehicle device only needs to include the actuator 20, an electronic device attached to one of the first output member 41 or the second output member 42 of the actuator 20, and the support member 19 that supports the other of the first output member 41 and the second output member 42. For example, the electronic device is not limited, and may be an on-vehicle sensor such as a camera, a light detection and ranging (LiDAR), or a millimeter wave radar. The lamp unit 15 as an electronic device may be attached to the second output member 42, and the support member 19 may support the first output member 41.

The above embodiment describes as an example the actuator 20 in which the first rotation axis 41*c* and the second rotation axis 42*c* perpendicularly intersect each other. However, the first rotation axis 41*c* and the second rotation axis 42*c* only need to be non-parallel to each other, and the first rotation axis 41*c* and the second rotation axis 42*c* may not intersect each other.

The above embodiment describes as an example the actuator 20 including the shaft 45 that rotates together with the first output member 41. However, the actuator 20 may not include the shaft 45.

The above embodiment describes as an example the actuator 20 in which the torque of the motor 65 is transmitted to the input member 115 via the spur gear 66, the first spur gear 114*a*, the second spur gear 114*b*, the first planetary gear 113, and the internal gear 53. However, the input member 115 only needs to rotate about the rotation axis by the torque of the motor 65, and for example, the input member 115 may be fixed to the output shaft of the motor 65.

In the present embodiment, the control unit 72 adjusts the orientation of the lamp unit 15 by controlling the motor 65 before shipping or during inspection of the vehicle. However, the timing of adjusting the orientation of the lamp unit 15 is not limited. For example, the control unit 72 may adjust the orientation of the lamp unit 15 while the vehicle is traveling, and at this time, the control unit 72 may or may not stop the emission of light from the lamp unit 15. The control unit 72 may adjust the orientation of the lamp unit 15 in response to a signal from various sensors provided in the vehicle, and the control unit 72 may be disposed outside the case 21.

The present invention provides an actuator that can change the orientation of an electronic device in two directions non-parallel to each other by one motor, and an on-vehicle device using the actuator. The actuator and the on-vehicle device can be used in the fields of a lamp unit or a sensor mounted on an automobile or the like.

The invention claimed is:

1. An actuator comprising:

an input member configured to rotate about a rotation axis by torque of a motor;

a first output member configured to rotate about a first rotation axis;

a second output member configured to rotate about a second rotation axis non-parallel to the first rotation axis; and a power transmission switching unit configured to switch between a state in which the first output member rotates and a state in which the second output member rotates by torque of the input member, wherein the power transmission switching unit is configured to connect the input member and the first output member to establish a first connection state in a first rotation state in which a rotation angle of the input member is within a predetermined range, and ensure that the first output member rotates forward in line with forward rotation of the input member and the first output member rotates backward in line with backward rotation of the input member, connect the input member and the second output member to establish a second connection state in a second rotation state in which the input member rotates forward by an angle exceeding an upper limit of the predetermined range, and ensure that the second output member rotates forward in line with forward rotation of the input member, connect the input member and the second output member to establish a third connection state in a third rotation state in which the input member rotates backward by an angle falling below a lower limit of the predetermined range, and ensure that the second output member rotates backward in line with backward rotation of the input member, establish the first connection state in which the predetermined range is shifted to a forward rotation side of the input member by an angle from the upper limit of the predetermined range to a rotation angle of the input member in backward rotation when the input member rotates backward in the second connection state, and establish the first connection state in which the predetermined range is shifted to a backward rotation side of the input member by an angle from the lower limit of the predetermined range to a rotation angle of the input member in forward rotation when the input member rotates forward in the third connection state.

2. The actuator according to claim 1, further comprising a substrate on which a sensor configured to detect inclination is mounted, the substrate being configured to rotate together with the first output member.

3. The actuator according to claim 2, wherein the substrate extends in a direction perpendicular to the first rotation axis.

4. The actuator according to claim 1, wherein the rotation axis of the input member coincides with the first rotation axis.

5. The actuator according to claim 1, wherein the first rotation axis and the second rotation axis perpendicularly intersect each other.

6. The actuator according to claim 1, further comprising a shaft extending along the first rotation axis, the shaft being configured to rotate together with the first output member, wherein the first output member includes a shaft portion extending along the first rotation axis on an opposite side of the shaft in a direction along the first rotation axis.

7. An on-vehicle device comprising:

the actuator according to claim 1;

an electronic device attached to one of the first output member or the second output member of the actuator; and a support member that supports the other of the first output member or the second output member.

8. The on-vehicle device according to claim 7, wherein the electronic device is a lamp unit configured to emit light toward a front of a vehicle, and an emission direction of light emitted from the lamp unit is changed in an up-down direction by rotation of the first output member, and an emission direction of light emitted from the lamp unit is changed in a left-right direction by rotation of the second output member.

* * * * *